(12) United States Patent
McSporran et al.

(10) Patent No.: US 9,630,875 B2
(45) Date of Patent: Apr. 25, 2017

(54) HEAT TREATABLE COATED GLASS PANE

(75) Inventors: Neil McSporran, Perrysburg, OH (US); Monica Joscelyn Hughes, St. Helens (GB); Gregory Charles Bernard Clarke, Manchester (GB)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 13/261,756

(22) PCT Filed: Apr. 16, 2012

(86) PCT No.: PCT/GB2012/050837
§ 371 (c)(1),
(2), (4) Date: Nov. 6, 2013

(87) PCT Pub. No.: WO2012/143704
PCT Pub. Date: Oct. 26, 2012

(65) Prior Publication Data
US 2014/0087160 A1    Mar. 27, 2014

(30) Foreign Application Priority Data
Apr. 21, 2011 (GB) .................................. 1106788.1

(51) Int. Cl.
*C03C 17/36* (2006.01)
*C03C 17/00* (2006.01)
*G02B 1/115* (2015.01)

(52) U.S. Cl.
CPC ........ *C03C 17/3644* (2013.01); *C03C 17/002* (2013.01); *C03C 17/36* (2013.01);
(Continued)

(58) Field of Classification Search
CPC ............ C03C 17/3652; C03C 17/3626; C03C 17/3644
See application file for complete search history.

(56) References Cited

U.S. PATENT DOCUMENTS

| 5,153,054 A | 10/1992 | Depauw et al. |
| 5,302,449 A | 4/1994 | Eby et al. |

(Continued)

FOREIGN PATENT DOCUMENTS

| DE | 10042194 B4 * | 7/2008 | ............ C03C 17/36 |
| DE | 102008007981 B4 | 12/2009 | |

(Continued)

OTHER PUBLICATIONS

Machine translation of JP H11/157881 A, obtained from Industrial Property Digital Library of the JPO on Sep. 30, 2015.*
(Continued)

*Primary Examiner* — Aaron Austin
*Assistant Examiner* — Zheren J Yang
(74) *Attorney, Agent, or Firm* — Marshall & Melhorn, LLC

(57) ABSTRACT

A coated glass pane comprising at least the following layers in sequence: a glass substrate; a lower anti-reflection layer; a silver-based functional layer; a barrier layer, comprising at least the following three partial barrier layers in sequence from the silver-based functional layer, a lower partial barrier layer based on an oxide of Zn, Ti, ZnSn, InSn, Zr, Al, Sn and/or Si, and/or an (oxi)nitride of Si and/or of Al, having a thickness of at most 5 nm, a central partial barrier layer based on an oxide of Zn, Ti, Zn Sn, InSn, Zr, Al, Sn and/or Si, and/or an (oxi)nitride of Si and/or of Al, having a thickness of at most 5 nm, and an upper partial barrier layer based on an oxide of Zn, Ti, Zn Sn, InSn, Zr, Al, Sn and/or Si, and/or an (oxi)nitride of Si and/or of Al, having a thickness of at most 10 nm; and an upper anti-reflection layer; wherein the central partial barrier layer has a different composition to both the lower partial barrier layer and the upper partial barrier layer.

20 Claims, 1 Drawing Sheet

A

B

(52) U.S. Cl.
CPC ........ *C03C 17/366* (2013.01); *C03C 17/3626* (2013.01); *C03C 17/3681* (2013.01); *G02B 1/115* (2013.01); *C03C 2217/78* (2013.01); *C03C 2218/154* (2013.01); *Y10T 428/24975* (2015.01)

(56) References Cited

U.S. PATENT DOCUMENTS

| | | | |
|---|---|---|---|
| 5,318,685 A * | 6/1994 | O'Shaughnessy | 204/192.27 |
| 6,398,925 B1 | 6/2002 | Arbab et al. | |
| 6,589,658 B1 * | 7/2003 | Stachowiak | C03C 17/36 428/426 |
| 6,833,194 B1 | 12/2004 | O'Shaughnessy | |
| 6,899,953 B1 | 5/2005 | O'Shaughnessy et al. | |
| 7,329,433 B2 | 2/2008 | O'Shaughnessy et al. | |
| 7,413,768 B2 | 8/2008 | O'Shaughnessy | |
| 8,003,235 B2 | 8/2011 | Gagliardi et al. | |
| 8,043,707 B2 | 10/2011 | Schicht et al. | |
| 8,497,014 B2 | 7/2013 | Unquera et al. | |
| 2002/0102352 A1 * | 8/2002 | Hartig | C03C 17/36 427/165 |
| 2003/0180547 A1 * | 9/2003 | Buhay | B32B 17/10036 428/434 |
| 2003/0228476 A1 * | 12/2003 | Buhay et al. | 428/469 |
| 2005/0123772 A1 * | 6/2005 | Coustet | C03C 17/36 428/432 |
| 2005/0238923 A1 * | 10/2005 | Thiel | B32B 17/10 428/701 |
| 2006/0124449 A1 * | 6/2006 | Hartig | C03C 17/36 204/192.15 |
| 2006/0280951 A1 * | 12/2006 | Fleury | B32B 17/10018 428/432 |
| 2007/0104965 A1 * | 5/2007 | Labrousse | B32B 17/10036 428/432 |
| 2007/0273991 A1 * | 11/2007 | List | C03C 17/3423 359/887 |
| 2008/0187692 A1 * | 8/2008 | Roquiny | C03C 17/36 428/34 |
| 2008/0311389 A1 * | 12/2008 | Roquiny | C03C 17/36 428/336 |
| 2009/0047509 A1 * | 2/2009 | Gagliardi | C03C 17/36 428/336 |
| 2009/0169846 A1 | 7/2009 | Siddle et al. | |
| 2009/0197077 A1 | 8/2009 | Reutler et al. | |
| 2009/0258222 A1 * | 10/2009 | Roquiny | C03C 17/3639 428/336 |
| 2009/0274901 A1 * | 11/2009 | Roquiny | C03C 17/36 428/336 |
| 2009/0324934 A1 * | 12/2009 | Blacker et al. | 428/333 |
| 2010/0136365 A1 * | 6/2010 | Unquera | C03C 17/36 428/623 |
| 2010/0279144 A1 * | 11/2010 | Frank | C03C 17/36 428/623 |
| 2011/0020638 A1 * | 1/2011 | Di Stefano | C03C 17/36 428/336 |
| 2011/0070417 A1 | 3/2011 | Reutler et al. | |
| 2011/0117300 A1 * | 5/2011 | Wagner | C03C 17/36 428/34 |
| 2012/0087005 A1 * | 4/2012 | Reymond | C03C 17/36 359/360 |
| 2012/0225316 A1 * | 9/2012 | Imran | C03C 17/36 428/623 |
| 2013/0344321 A1 * | 12/2013 | McSporran | C03C 17/36 428/336 |
| 2015/0274584 A1 * | 10/2015 | Kleinhempel | B32B 17/10 428/216 |

FOREIGN PATENT DOCUMENTS

| | | | |
|---|---|---|---|
| EP | 0304234 A2 | 2/1989 | |
| EP | 0593883 A1 | 4/1994 | |
| EP | 1140721 B1 | 3/2004 | |
| GB | WO 2010073042 A1 * | 7/2010 | ............ C03C 17/36 |
| JP | 11157881 A * | 6/1999 | |
| WO | 2006048462 A2 | 5/2006 | |
| WO | 2007080428 A1 | 7/2007 | |
| WO | 2007113259 A2 | 10/2007 | |
| WO | 2009001143 A1 | 12/2008 | |
| WO | 2010073042 A1 | 7/2010 | |
| WO | 2010136788 A1 | 12/2010 | |

OTHER PUBLICATIONS

Hattori, I., et al; Low Radiation Glass-Laminated Body; Database WPI; XP0022679023; Database WPI, Jun. 15, 1999; vol. 1999, Nr: 34; Publisher accession No. 1999-39972; Thomson Scientific, London, GB.

* cited by examiner

A
B

HEAT TREATABLE COATED GLASS PANE

BACKGROUND OF THE INVENTION

The invention relates to heat treatable coated glass panes with a low-e and/or solar control coating. The invention also relates to methods of manufacturing said panes.

Heat treated glass panes which are toughened to impart safety properties and/or are bent are required for a large number of areas of application, for example for architectural or motor vehicle glazings. It is known that for thermally toughening and/or bending glass panes it is necessary to process the glass panes by a heat treatment at temperatures near or above the softening point of the glass used and then either to toughen them by rapid cooling or to bend them with the aid of bending means. The relevant temperature range for standard float glass of the soda lime silica type is typically about 580-690° C., the glass panes being kept in this temperature range for several minutes before initiating the actual toughening and/or bending process.

"Heat treatment", "heat treated" and "heat treatable" in the following description and in the claims refer to thermal bending and/or toughening processes such as mentioned before and to other thermal processes during which a coated glass pane reaches temperatures in the range of about 580-690° C. for a period of several minutes, e.g., for up to about 10 minutes. A coated glass pane is deemed to be heat treatable if it survives a heat treatment without significant damage, typical damages caused by heat treatments being high haze values, pinholes or spots.

The inventors of the present invention found that the parameter "haze" usually referred to when characterising the heat treatability of low-e and/or solar control coatings is often insufficient, as it does not fully reflect all types of defects that may arise during coating, heat treating, processing and/or handling of coated glass panes. They found that several low-e and/or solar control coated panes described as heat treatable did not withstand all of the tests simulating ordinary environmental influences during storage, transport and use of the coated glass panes before and after a heat treatment, and the mechanical and chemical conditions acting on the coated glass panes during usual handling and processing steps, without significant visible damage.

The invention more particularly concerns coated glass panes wherein the coating comprises at least a lower anti-reflection layer, a silver-based functional layer, a barrier layer, and an upper anti-reflection layer. In such coatings the barrier layer serves to protect the silver-based functional layer against detrimental influences during production and subsequent heat treatments. The anti-reflection layers serve to anti-reflect the functional layer to achieve a high light transmittance and low reflectance. The barrier layer may contribute to the anti-reflecting effect of the subsequent anti-reflection layer.

DE10042194 describes an IR reflecting layer system with layers of gradually changing composition. At least one IR reflecting metal layer such as Ag, Au or Cu is present, with a $Nb_2O_5$ based lower dielectric layer. No specific examples are disclosed, although potential stacks with a $TiO_2$ barrier layer and $ZnO/TiO_2$ topcoats are mentioned. There is no discussion of mechanical durability properties or heat treatability of the stacks in DE10042194.

EP1140721 describes silver based heat-treatable low-e coatings that avoid the use of protective metal primer (barrier) layers such as $NiCrO_x$ or $TiO_x$ over silver layers. The stacks contain at least two silver-based layers and utilise single aluminium doped zinc oxide barrier layers.

EP0304234 describes a coated pane with a silver-based layer that is protected from staining by providing a barrier layer comprising the oxides of at least two metals. $TiO_2/ZnO/TiO_2$ layer arrangements above the silver layer are mentioned. The barrier layers are said to be non-transmissive of moisture and other staining agents, amorphous and free of grain boundaries.

EP0593883 describes coated panes with high light transmittance and IR reflection properties. The coating includes a metallic double layer of for instance a titanium barrier layer deposited on top of a silver layer. A triple dielectric layer of for example $ZnO/TiO_2/ZnO$ is deposited on top of the barrier layer.

U.S. Pat. No. 5,302,449 describes high light transmittance, low-e coated panes that exhibit a neutral colour through a wide range of angles of incidence of light. The coating uses a dual silver layer arrangement and sacrificial barrier layers of metal oxides such as $TiO_2$. The outermost barrier layer may be coated with one or more additional oxide layers.

It is well known to use substoichiometric $NiCrO_x$ as a sacrificial barrier layer (e.g. see US2009/0197077 and WO 2010/073042) since it affords favourable heat treatability and subsequent mechanical durability (see DE102008007981 and US20100178492). However, the presence of a $NiCrO_x$ layer complicates manufacturing because of the critical conditions required to deposit a layer of the correct stoichiometry. The use of $NiCrO_x$ furthermore leads to significant changes of optical properties, i.e. light transmittance, colour, absorption, light reflectance of the coating stack during a heat treatment. Therefore it would be attractive to provide a coated glass pane that exhibits good heat treatability and mechanical durability without the need for a substoichiometric $NiCrO_x$ sacrificial barrier layer above a silver-based functional layer.

SUMMARY OF THE INVENTION

Accordingly, the present invention specifically aims at providing coated glass panes that show an extremely low level of visible damage as evaluated according to a number of tests simulating certain use, processing and handling conditions for coated glass panes that are described further below in more detail.

The invention furthermore aims to provide heat treatable coated glass panes that either have a particularly high light transmittance and low emissivity or that show good solar control properties, i.e. have a low solar energy transmittance combined with a sufficiently high light transmittance. The invention also aims to provide heat treatable coated glass panes, the optical properties of which may remain stable during a heat treatment.

According to a first aspect of the present invention there is provided a coated glass pane comprising at least the following layers in sequence:
- a glass substrate;
- a lower anti-reflection layer;
- a silver-based functional layer;
- a barrier layer, comprising at least the following three partial barrier layers in sequence from the silver-based functional layer,
  - a lower partial barrier layer based on an oxide of Zn, Ti, ZnSn, InSn, Zr, Al, Sn and/or Si, and/or an (oxi) nitride of Si and/or of Al, having a thickness of at most 5 nm, a central partial barrier layer based on an oxide of Zn, Ti, ZnSn, InSn, Zr, Al, Sn and/or Si, and/or an (oxi)nitride of Si and/or of Al, having a thickness of at most 5 nm, and an upper partial barrier layer based on an oxide of Zn, Ti, ZnSn, InSn, Zr, Al, Sn and/or Si, and/or an (oxi)nitride of Si and/or of Al, having a thickness of at most 10 nm; and an upper anti-reflection layer;

wherein the central partial barrier layer has a different composition to both the lower partial barrier layer and the upper partial barrier layer.

The coated glass panes of the present invention provide good heat treatability and mechanical durability, without the need for a sacrificial barrier layer comprising $NiCrO_x$ above the silver-based functional layer. The panes exhibit particularly low haze before and after heat treatments such as toughening, which indicates that the demonstrable improvement in mechanical robustness over single and double barrier layer combinations does not compromise heat treatability. The panes of the present invention show an extremely low level of visible damage as evaluated according to a number of tests simulating certain use, processing and handling conditions for coated glass panes. Furthermore the panes exhibit high light transmittance and low emissivity and/or good solar control properties, with optical properties remaining stable during a heat treatment.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

In the context of the present invention, where a layer is said to be "based on" a particular material or materials, this means that the layer predominantly consists of the corresponding said material or materials, which means typically that it comprises at least about 50 at. % of said material or materials.

Preferably the coated glass pane consists of the glass substrate and the four layers in sequence as set out in the first aspect.

The lower anti-reflection layer may comprise one or more of a base layer based on an (oxi)nitride of silicon, an (oxi)nitride of aluminium and/or alloys thereof, an oxide of Ti, and/or an oxide of Zr; a layer based on an oxide of Zn and Sn and/or an oxide of Sn; a separation layer based on a metal oxide and/or an (oxi)nitride of silicon and/or an (oxi)nitride of aluminium; and a top layer based on an oxide of Zn.

Preferably the lower anti-reflection layer comprises, in sequence from the glass substrate, a base layer based on an (oxi)nitride of silicon, an (oxi)nitride of aluminium and/or alloys thereof, an oxide of Ti, and/or an oxide of Zr;

a layer based on an oxide of Zn and Sn and/or an oxide of Sn; and a top layer based on an oxide of Zn.

Preferably the lower anti-reflection layer consists of the three layers in sequence as set out above.

Even more preferably the lower anti-reflection layer comprises, in sequence from the glass substrate, a base layer based on an (oxi)nitride of silicon, an (oxi)nitride of aluminium and/or alloys thereof, an oxide of Ti, and/or an oxide of Zr;

a layer based on an oxide of Zn and Sn and/or an oxide of Sn;

a separation layer based on a metal oxide and/or an (oxi)nitride of silicon and/or an (oxi)nitride of aluminium; and a top layer based on an oxide of Zn.

Even more preferably the lower anti-reflection layer consists of the four layers in sequence as set out above.

The base layer based on an (oxi)nitride of silicon, an (oxi)nitride of aluminium and/or alloys thereof, an oxide of Ti, and/or an oxide of Zr of the lower anti-reflection layer may have a thickness of at least 5 nm, preferably from 5 to 60 nm, more preferably from 10 to 50 nm, even more preferably from 20 to 40 nm, most preferably from 25 to 35 nm. This base layer serves as a glass side diffusion barrier amongst other uses.

The term "(oxi)nitride of silicon" encompasses both Si nitride ($SiN_x$) and Si oxinitride ($SiO_xN_y$) whilst the term "(oxi)nitride of aluminium" encompasses both Al nitride ($AlN_x$) and Al oxinitride ($AlO_xN_y$). Si nitride, Si oxinitride, Al nitride and Al oxinitride layers are preferably essentially stoichiometric (e.g. Si nitride=$Si_3N_4$, x=1.33) but may also be substoichiometric or even super-stoichiometric, as long as the heat treatability of the coating is not negatively affected thereby. One preferred composition of the base layer based on an (oxi)nitride of silicon and/or an (oxi)nitride of aluminium of the lower anti-reflection layer is an essentially stoichiometric mixed nitride $Si_{90}Al_{10}N_x$.

Layers of an (oxi)nitride of silicon and/or an (oxi)nitride of aluminium may be reactively sputtered from Si- and/or Al-based targets respectively in a sputtering atmosphere containing nitrogen and argon. An oxygen content of the base layer based on an (oxi)nitride of silicon and/or an (oxi)nitride of aluminium may result from residual oxygen in the sputtering atmosphere or from a controlled content of added oxygen in said atmosphere. It is generally preferred if the oxygen content of the silicon (oxi)nitride and/or aluminium (oxi)nitride is significantly lower than its nitrogen content, i.e. if the atomic ratio O/N in the layer is kept significantly below 1. It is most preferred to use Si nitride and/or aluminium nitride with negligible oxygen content for the base layer of the lower anti-reflection layer. This feature may be controlled by making sure that the refractive index of the layer does not differ significantly from the refractive index of an oxygen-free Si nitride and/or aluminium nitride layer.

It is within the scope of the invention to use mixed Si and/or Al targets or to otherwise add metals or semiconductors to the Si and/or Al component of this layer as long as the essential barrier and protection property of the base layer of the lower anti-reflection layer is not lost. It is well known and established to mix Al with Si targets, other mixed targets not being excluded. Additional components may be typically present in amounts of up to about 10-15 wt. %. Al is usually present in mixed Si targets in an amount of about 10 wt. %.

The base layer of the lower anti-reflection layer may be based on $TiO_x$ and/or $ZrO_x$ where x is from 1.5 to 2.0.

The layer based on an oxide of Zn and Sn and/or an oxide of Sn of the lower anti-reflection layer serves to improve stability during a heat treatment by providing a dense and thermally stable layer and contributing to reduce the haze after a heat treatment. The layer based on an oxide of Zn and Sn and/or an oxide of Sn of the lower anti-reflection layer may have a thickness of at least 0.5 nm, preferably from 0.5 to 10 nm, more preferably from 0.5 to 9 nm, even more preferably from 1 to 8 nm, even more preferably from 1 to 7 nm, even more preferably from 2 to 6 nm, even more preferably from 3 to 6 nm, most preferably from 3 to 5 nm. An upper thickness limit of about 8 nm is preferred due to optical interference conditions and by a reduction of heat treatability due to the resulting reduction in the thickness of the base layer that would be needed to maintain the optical interference boundary conditions for anti-reflecting the functional layer.

The layer based on an oxide of Zn and Sn and/or an oxide of Sn of the lower anti-reflection layer is preferably located directly on the base layer based on an (oxi)nitride of silicon and/or an (oxi)nitride of aluminium.

The layer based on an oxide of Zn and Sn (abbreviation: $ZnSnO_x$) of the lower anti-reflection layer preferably comprises about 10-90 wt. % Zn and 90-10 wt. % Sn, more preferably about 40-60 wt. % Zn and about 40-60 wt. % Sn, preferably about 50 wt. % each of Zn and Sn, in wt. % of its total metal content. In some preferred embodiments the layer based on an oxide of Zn and Sn of the lower anti-reflection layer may comprise at most 18 wt. % Sn, more preferably at most 15 wt. % Sn, even more preferably at most 10 wt. % Sn. The layer based on an oxide of Zn and Sn may be deposited by reactive sputtering of a mixed ZnSn target in the presence of $O_2$.

The separation layer based on a metal oxide and/or an (oxi)nitride of silicon and/or an (oxi)nitride of aluminium may have a thickness of at least 0.5 nm, preferably from 0.5 to 6 nm, more preferably from 0.5 to 5 nm, even more preferably from 0.5 to 4 nm, most preferably from 0.5 to 3 nm. These preferred thicknesses enable further improvement in haze upon heat treatment. The separation layer provides protection during the deposition process and during a subsequent heat treatment. The separation layer is either essentially fully oxidised immediately after its deposition, or it oxidizes to an essentially fully oxidized layer during deposition of a subsequent oxide layer.

The separation layer may be deposited using non-reactive sputtering from a ceramic target based on for instance a slightly substoichiometric titanium oxide, for example a $TiO_{1.98}$ target, as an essentially stoichiometric or as a slightly substoichiometric oxide, by reactive sputtering of a target based on Ti in the presence of $O_2$, or by depositing a thin layer based on Ti which is then oxidised. In the context of the present invention, an "essentially stoichiometric oxide" means an oxide that is at least 95% but at most 105% stoichiometric, whilst a "slightly substoichiometric oxide" means an oxide that is at least 95% but less than 100% stoichiometric.

When the separation layer is based on a metal oxide said separation layer may comprise a layer based on an oxide of Ti, NiCr, InSn, Zr, Al and/or Si.

In addition to the metal oxide and/or (oxi)nitride of silicon and/or (oxi)nitride of aluminium on which it is based, the separation layer may further include one or more other chemical elements chosen from at least one of the following elements Ti, V, Mn, Co, Cu, Zn, Zr, Hf, Al, Nb, Ni, Cr, Mo, Ta, Si or from an alloy based on at least one of these materials, used for instance as dopants or alloyants.

The top layer based on an oxide of Zn primarily functions as a growth promoting layer for a subsequently deposited silver-based functional layer. The top layer based on an oxide of Zn is optionally mixed with metals such as Al or Sn in an amount of up to about 10 wt. % (wt. % referring to the target metal content). A typical content of said metals such as Al or Sn is about 2 wt. %, Al being actually preferred.

ZnO and mixed Zn oxides have proven very effective as a growth promoting layer that assists in achieving a low sheet resistance at a given thickness of the subsequently deposited silver-based functional layer. It is preferred if the top layer of the lower anti-reflection layer is reactively sputtered from a Zn target in the presence of $O_2$ or if it is deposited by sputtering a ceramic target, e.g. based on ZnO:Al, in an atmosphere containing no or only a low amount, generally no more than about 5 vol. %, of oxygen. The top layer based on an oxide of Zn may have a thickness of at least 2 nm, preferably from 2 to 15 nm, more preferably from 3 to 12 nm, even more preferably from 4 to 10 nm, even more preferably from 5 to 8 nm.

The silver-based functional layer(s) may consist essentially of silver without any additive, as is normally the case in the area of low-e and/or solar control coatings. It is, however, within the scope of the invention to modify the properties of the silver-based functional layer(s) by adding doping agents, alloy additives or the like or even adding very thin metal or metal compound layers, as long as the properties of the silver-based functional layer(s) necessary for its (their) function as highly light-transmitting and low light-absorbent IR-reflective layer(s) are not substantially impaired thereby.

The thickness of a silver-based functional layer is dominated by its technical purpose. For typical low-e and/or solar control purposes the preferred layer thickness for a single silver-based layer is from 5 to 20 nm, more preferably from 5 to 15 nm, even more preferably from 5 to 13 nm, even more preferably from 8 to 12 nm, most preferably from 10 to 11 nm. With such a layer thickness light transmittance values of above 86% and a normal emissivity below 0.05 after a heat treatment can be easily achieved for single silver coatings. If better solar control properties are aimed at the thickness of the silver-based functional layer may be adequately increased or several spaced functional layers may be provided as further explained below.

Preferably the top layer based on an oxide of Zn in the lower anti-reflection layer is in direct contact with the silver-based functional layer. Preferably the layers between the glass substrate and the silver-based functional layer consist of the four layers of the lower anti-reflection layer listed above.

While the invention is primarily directed to coated panes with only one silver-based functional layer it is within the scope of the invention to apply the inventive concept to low-e and/or solar control coatings comprising two or even more silver-based functional layers. By providing more than one silver-based functional layer, all functional layers are spaced by intervening dielectric layers (="central anti-reflection layers") to form a Fabry-Perot interference filter, whereby the optical properties of the low-e and/or solar control coating may be further optimized for the respective application, as is well known in the art.

Preferably each silver-based functional layer is spaced apart from an adjacent silver-based functional layer by an intervening central anti-reflection layer. The intervening central anti-reflection layer(s) may comprise a combination of one or more of the following layers: a base layer based on an (oxi)nitride of silicon and/or an (oxi)nitride of aluminium, a layer based on an oxide of Zn and Sn and/or an oxide of Sn, a separation layer based on a metal oxide and/or an (oxi)nitride of silicon and/or and (oxi)nitride of aluminium, and a top layer based on an oxide of Zn.

In some preferred embodiments each silver-based functional layer is spaced apart from an adjacent silver-based functional layer by an intervening central anti-reflection layer, wherein each central anti-reflection layer comprises at least, in sequence from the silver-based functional layer that is located nearest to the glass substrate out of the silver-based functional layers that the central anti-reflection layer is located between, a base layer based on an (oxi)nitride of silicon and/or an (oxi)nitride of aluminium, a layer based on an oxide of Zn and Sn and/or an oxide of Sn, and a top layer based on an oxide of Zn.

In some cases each central anti-reflection layer located between two silver-based functional layers comprises at least—in sequence from the lower functional layer—a base layer based on an (oxi)nitride of silicon and/or an (oxi)nitride of aluminium, a layer based on an oxide of Zn and Sn and/or an oxide of Sn, a separation layer based on a metal oxide and/or an (oxi)nitride of silicon and/or an (oxi)nitride of aluminium, and a top layer based on an oxide of Zn.

The lower partial barrier layer of the barrier layer may preferably be based on an oxide of Zn and/or an oxide of Ti. The central partial barrier layer of the barrier layer may preferably be based on an oxide of Zn, an oxide of Ti, an oxide of Sn and/or an oxide of Zn and Sn. The upper partial barrier layer of the barrier layer may preferably be based on an oxide of Zn and/or an oxide of Ti.

The lower partial barrier layer of the barrier layer may preferably have a thickness of at least 0.5 nm, more preferably at least 1 nm, even more preferably at least 1.5 nm; but preferably less than 5 nm, more preferably at most 4 nm, even more preferably less than 4 nm, most preferably at most 3 nm. These preferred thicknesses enable further ease of deposition and improvement in optical characteristics such as haze whilst retaining mechanical durability.

The central partial barrier layer of the barrier layer may preferably have a thickness of at least 0.5 nm, more preferably at least 1 nm, even more preferably at least 1.5 nm; but preferably less than 5 nm, more preferably less than 4 nm, most preferably at most 3 nm. These preferred thicknesses enable further ease of deposition and improvement in optical characteristics such as haze whilst retaining mechanical durability.

The upper partial barrier layer of the barrier layer may preferably have a thickness of at least 0.5 nm, more preferably at least 1 nm, even more preferably at least 1.5 nm; but preferably less than 10 nm, more preferably less than 8 nm, even more preferably at most 7 nm, even more preferably less than 5 nm, most preferably less than 4.5 nm. These preferred thicknesses enable further ease of deposition and improvement in optical characteristics such as haze whilst retaining mechanical durability.

The barrier layer may have a total thickness of at least 2 nm, preferably at least 4 nm, even more preferably at least 6 nm, most preferably at least 8 nm; but at most 20 nm, preferably at most 15 nm, even more preferably at most 13 nm, most preferably at most 12 nm. Such barrier layer thicknesses enable further ease of deposition and improvement in optical characteristics whilst retaining mechanical durability.

It has been found that a superior protection of the silver-based functional layer during the deposition process and a high optical stability during a heat treatment can be achieved if the barrier layer comprises a layer of a mixed metal oxide sputtered from a mixed metal oxide target. When the lower partial barrier layer, the central partial barrier layer and/or the upper partial barrier layer of the barrier layer is based on an oxide of Zn, said oxide may be a mixed metal oxide such as ZnO:Al. Good results are particularly achieved if a layer based on ZnO:Al is sputtered from a conductive ZnO:Al target. ZnO:Al may be deposited fully oxidized or such that it is slightly suboxidic.

Preferably the lower, central and upper partial barrier layers of the barrier layer are based on essentially stoichiometric metal oxides. The use of partial barrier layers based on essentially stoichiometric metal oxides rather than metallic or less than 95% stoichiometric barrier layers leads to an extremely high optical stability of the coating during a heat treatment and effectively assists in keeping optical modifications during a heat treatment small. Additionally the use of partial barrier layers based on essentially stoichiometric metal oxides provides benefits in terms of mechanical robustness.

At least a portion of the barrier layer that is in direct contact with the silver-based functional layer is preferably deposited using non-reactive sputtering of an oxidic target to avoid silver damage.

Preferably the lower and upper partial barrier layers of the barrier layer are deposited by non-reactive sputtering. Preferably the central partial barrier layer of the barrier layer is deposited by reactive sputtering. Preferably the lower and upper partial barrier layers of the barrier layer are sputtered from ceramic targets. Preferably the central partial barrier layer of the barrier layer is sputtered from one or more metal targets. In the context of the present invention the term "non-reactive sputtering" includes sputtering an oxidic target in a low oxygen atmosphere (no or up to 5% vol. oxygen) to provide an essentially stoichiometric oxide.

Preferably the barrier layer consists of the three layers in sequence from the silver-based functional layer as set out above. The barrier layer may preferably be selected from the group consisting of the following combinations of layers in sequence from the silver-based functional layer: ZnO:Al/TiO$_x$/ZnO:Al, ZnO:Al/ZnSnO$_x$/ZnO:Al, TiO$_x$/ZnSnO$_x$/ZnO:Al, TiO$_x$/ZnO:Al/TiO$_x$, TiO$_x$/ZnSnO$_x$/TiO$_x$, and ZnO:Al/ZnSnO$_x$/TiO$_x$.

Where a partial barrier layer is based on TiO$_x$, x may be from 1.5 to 2.0. Where a partial barrier layer is based on ZnSnO$_x$, "ZnSnO$_x$" means a mixed oxide of Zn and Sn as described and defined elsewhere in the description.

Preferably the barrier layer does not comprise a partial barrier layer based on an oxide of NiCr. Preferably the barrier layer does not comprise a partial barrier layer of (substoichiometric) NiCrO$_x$.

The upper anti-reflection layer may have a total thickness of from 20 to 50 nm, preferably from 25 to 50 nm, more preferably from 30 to 50 nm, even more preferably from 35 to 45 nm.

The upper anti-reflection layer may include a layer based on an (oxi)nitride of aluminium, an (oxi)nitride of silicon, and/or an oxide of Al, Si, Ti, and/or Zr. Said layer may have a thickness of at least 5 nm, preferably from 5 to 50 nm, more preferably from 10 to 40 nm, even more preferably from 10 to 30 nm, most preferably from 15 to 30 nm. Such thicknesses provide further improvement in terms of mechanical robustness of the coated pane. Said layer based on an (oxi)nitride of aluminium, an (oxi)nitride of silicon, and/or an oxide of Al, Si, Ti, and/or Zr may preferably be in direct contact with the barrier layer.

The layer based on an (oxi)nitride of aluminium, an (oxi)nitride of silicon, and/or an oxide of Al, Si, Ti, and/or Zr, which can in some cases make up a major part of the upper anti-reflection layer, provides stability (better protection during heat treatments) and diffusion barrier properties. Said layer is preferably deposited as an Al nitride and/or Si nitride layer by reactive sputtering of a Si, Al or mixed SiAl target, e.g. of a $Si_{90}Al_{10}$ target in a $N_2$ containing atmosphere. The composition of the layer based on an (oxi)nitride of aluminium and/or an (oxi)nitride of silicon may be essentially stoichiometric $Si_{90}Al_{10}N_x$.

The upper anti-reflection layer may include a layer based on a metal oxide, such as an oxide of Zn and Sn and/or an oxide of Sn. The layer based on a metal oxide of the upper anti-reflection layer may have a thickness of at least 0.5 nm, preferably from 0.5 to 35 nm, more preferably from 0.5 to 25 nm, even more preferably from 2 to 20 nm, even more preferably from 5 to 18 nm, most preferably from 5 to 16 nm. Such thicknesses provide further improvement in terms of mechanical robustness of the coated pane. When said layer based on a metal oxide is an oxide of Zn and Sn it preferably comprises about 10-90 wt. % Zn and 90-10 wt. % Sn, more preferably about 40-60 wt. % Zn and about 40-60 wt. % Sn, preferably about 50 wt. % each of Zn and Sn, in wt. % of its total metal content. In some preferred embodiments said layer based on an oxide of Zn and Sn of the lower anti-reflection layer may comprise at most 18 wt. % Sn, more preferably at most 15 wt. % Sn, even more preferably at most 10 wt. % Sn. Said layer may be deposited by reactive sputtering of a mixed ZnSn target in the presence of $O_2$ and contributes to the anti-reflection properties of the upper anti-reflection layer.

Preferably the upper anti-reflection layer comprises
a layer based on an (oxi)nitride of aluminium and/or an (oxi)nitride of silicon, and
a layer based on a metal oxide.

Preferably the upper anti-reflection layer consists of the two layers as set out above.

The layer based on an (oxi)nitride of aluminium and/or an (oxi)nitride of silicon of the upper anti-reflection layer may be in direct contact with the layer based on a metal oxide in the upper anti-reflection layer as defined herein without any intervening further dielectric layer.

Preferably the layer based on a metal oxide of the upper anti-reflection layer comprises a layer based on an oxide of Zn and Sn and/or an oxide of Sn.

Preferably the upper anti-reflection layer comprises, in sequence from the barrier layer, a layer based on an (oxi) nitride of aluminium and/or an (oxi)nitride of silicon, and a layer based on a metal oxide.

Preferably the upper anti-reflection layer consists of the two layers in sequence from the barrier layer as set out above.

A protective layer may be deposited as top layer (outermost layer) of the upper anti-reflection layer for increased mechanical and/or chemical robustness, e.g. scratch resistance. Said protective layer may comprise a layer based on an oxide of Al, Si, Ti, and/or Zr.

To minimize any light absorption in the coating and to reduce the light transmittance increase during a heat treatment all individual layers of the upper and lower anti-reflection layers are preferably deposited with an essentially stoichiometric composition.

To further optimize the optical properties of the coated pane the upper and/or lower anti-reflection layers may comprise further partial layers consisting of suitable materials generally known for dielectric layers of low-e and/or solar control coatings, in particular chosen from one or more of the oxides of Sn, Ti, Zn, Nb, Ce, Hf, Ta, Zr, Al and/or Si and/or of (oxi)nitrides of Si and/or Al or combinations thereof. When adding such further partial layers it should however be verified that the heat treatability aimed at herein is not impaired thereby.

It will be appreciated that any further partial layer may contain additives that modify its properties and/or facilitate its manufacture, e.g. doping agents or reaction products of reactive sputtering gases. In the case of oxide based layers nitrogen may be added to the sputtering atmosphere leading to the formation of oxinitrides rather than oxides, in the case of nitride based layers oxygen may be added to the sputtering atmosphere, also leading to the formation of oxinitrides rather than nitrides.

Care must be taken by performing a proper material, structure and thickness selection when adding any such further partial layer to the basic layer sequence of the inventive pane that the properties primarily aimed at, e.g. a high thermal stability, are not significantly impaired thereby.

According to another aspect of the present invention there is provided a method of manufacturing a coated glass pane in accordance with the present invention comprising
providing a glass substrate and successively applying to said glass substrate
a lower anti-reflection layer,
a silver-based functional layer,
a lower partial barrier layer based on an oxide of Zn, Ti, ZnSn, InSn, Zr, Al, Sn and/or Si, and/or an (oxi)nitride of Si and/or of Al, having a thickness of at most 5 nm,
a central partial barrier layer based on an oxide of Zn, Ti, ZnSn, InSn, Zr, Al, Sn and/or Si, and/or an (oxi)nitride of Si and/or of Al, having a thickness of at most 5 nm,
an upper partial barrier layer based on an oxide of Zn, Ti, ZnSn, InSn, Zr, Al, Sn and/or Si, and/or an (oxi)nitride of Si and/or of Al, having a thickness of at most 10 nm, and
an upper anti-reflection layer,
wherein any portion of the lower partial barrier layer based on an oxide of Zn, Ti, ZnSn, InSn, Zr, Al, Sn and/or Si, and/or an (oxi)nitride of Si and/or of Al, that is in direct contact with the silver-based functional layer is deposited by sputtering in an atmosphere with no or up to 5% vol. oxygen.

The lower and upper anti-reflection layers may be as set out in the first aspect of the present invention.

The invention is not limited to a specific production process for the coating. However, it is particularly preferred if at least one of the layers and most preferably all layers are applied by magnetron cathode sputtering, either in the DC mode, in the pulsed mode, in the medium frequency mode or in any other suitable mode, whereby metallic or semi-conducting targets are sputtered reactively or non-reactively in a suitable sputtering atmosphere. Depending on the materials to be sputtered planar or rotating tubular targets may be used.

The lower and upper partial barrier layers based on an oxide of Zn, Ti, ZnSn, InSn, Zr, Al, Sn and/or Si, and/or an (oxi)nitride of Si and/or of Al, may be deposited by non-reactive sputtering. Said layers may be sputtered from ceramic targets.

The central partial barrier layer based on an oxide of Zn, Ti, ZnSn, InSn, Zr, Al, Sn and/or Si, and/or an (oxi)nitride of Si and/or of Al, may be deposited by reactive sputtering. Said layer may be sputtered from one or more metal targets.

The coating process is preferably carried out by setting up suitable coating conditions such that any oxygen (or nitrogen) deficit of any oxide (or nitride) layer of the anti-reflection layers of the coating is kept low to achieve a high stability of the light transmittance and colour of the coated glass panes during a heat treatment.

Light transmittance values referred to in the specification are generally specified with reference to a coated glass pane comprising a 4 mm thick standard float glass pane having a light transmittance $T_L$ of 89% without a coating.

While a neutral reflection and transmission colour of the coated glass panes is usually aimed at, the colour of the coated glass panes according to the invention may be varied widely by adapting the thicknesses of the individual layers appropriately according to the intended visual appearance of the product.

The thermal stability of coated glass panes according to the invention is reflected by the fact that the heat treated coated glass panes do not exhibit unacceptable levels of haze. Large increases in the haze value if detected during a heat treatment would indicate that the coating is beginning to be damaged. The mechanical durability of coated glass panes according to the invention is exemplified by the superior performance in oil rub and brush tests in comparison with prior art panes that also avoid the use of $NiCrO_x$ barrier layers.

According to another aspect of the present invention there is provided a multiple glazing incorporating a coated glass pane in accordance with the present invention. For example the multiple glazing may be laminated glass or insulated glass.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

BRIEF DESCRIPTION OF THE DRAWINGS

Embodiments of the present invention will now be described herein, by way of example only, with reference to the following FIGURE:

FIG. 1 shows photographs of the coated panes of Comparative Example 4 (A) and Example 5(B) after undergoing an oil rub test.

DETAILED DESCRIPTION OF THE INVENTION

For all Examples the coatings were deposited on 4 mm thick standard float glass panes with a light transmittance of about 89% using AC and/or DC magnetron sputtering devices, medium-frequency sputtering being applied where appropriate.

All dielectric layers of an oxide of Zn and Sn ($ZnSnO_x$, weight ratio Zn:Sn≈50:50) were reactively sputtered from zinc-tin targets in an $Ar/O_2$ sputter atmosphere.

The $TiO_x$ layers were deposited from slightly substoichiometric, conductive $TiO_x$ targets (x is about 1.98) in a pure Ar sputter atmosphere without added oxygen.

The ZnO:Al growth promoting top layers of the lower anti-reflection layers were sputtered from Al-doped Zn targets (Al content about 2 wt. %) in an $Ar/O_2$ sputter atmosphere.

The functional layers that in all Examples consisted of essentially pure silver (Ag) were sputtered from silver targets in an Ar sputter atmosphere without any added oxygen and at a partial pressure of residual oxygen below $10^{-5}$ mbar.

The barrier layers of Al-doped zinc oxide (ZnO:Al) were sputtered from conductive $ZnO_x$:Al targets in a pure Ar sputter atmosphere without added oxygen.

The suboxidic $NiCrO_x$ barrier layers were sputtered from $Ni_{80}Cr_{20}$ targets in an $Ar/O_2$ sputter atmosphere.

The layers of mixed silicon aluminium nitride ($Si_{90}Al_{10}N_x$) were reactively sputtered from mixed $Si_{90}Al_{10}$ targets in an $Ar/N_2$ sputter atmosphere containing only residual oxygen. The layers of Al nitride were reactively sputtered from Al targets in an $Ar/N_2$ sputter atmosphere containing only residual oxygen.

TABLE 1

Haze score, oil rub result, and brush test score for a number of comparative coated glass panes and coated glass panes according to the present invention.

|  | Example 1 Comparative | Example 2 Comparative | Example 3 Comparative | Example 4 Comparative |
|---|---|---|---|---|
|  | $Si_{90}Al_{10}N_x$ (21) | $Si_{90}Al_{10}N_x$ (21) | $Si_{90}Al_{10}N_x$ (25) | $Si_{90}Al_{10}N_x$ (25) |
|  | $ZnSnO_x$ (5) | $ZnSnO_x$ (5) | $ZnSnO_x$ (5) | $ZnSnO_x$ (5) |
|  |  |  | $TiO_x$ (2.5) | $TiO_x$ (2.5) |
|  | ZnO:Al (8) | ZnO:Al (5) | ZnO:Al (5) | ZnO:Al (5) |
|  | Ag (11) | Ag (11) | Ag (10.5) | Ag (10.5) |
|  | $NiCrO_x$ (1) | $NiCrO_x$ (1) |  |  |
|  | ZnO:Al (3) | ZnO:Al (3) | ZnO:Al (6) |  |
|  |  |  | $TiO_x$ (2) | $TiO_x$ (2) |
|  | AlN (24) |  |  | ZnO:Al (6) |
|  | $ZnSnO_x$ (8) | $ZnSnO_x$ (10) | $ZnSnO_x$ (10) | $ZnSnO_x$ (10) |
|  |  | $Si_{90}Al_{10}N_x$ (35) | $Si_{90}Al_{10}N_x$ (17) | $Si_{90}Al_{10}N_x$ (17) |
| Haze score | 1 (Pass) | 2 (Pass) | 3 (Pass) | 0 (Pass) |
| Oil rub score | 0 (Pass) | 2 (Fail) | 0 (Pass) | 3 (Fail) |
| Brush test score | Scratch (2) (Pass) | Scratch (2) + some delamination (fail) | Scratch (8) + some delamination (fail) | Near complete delamination (fail) |

|  | Example 5 | Example 6 | Example 7 | Example 8 | Example 9 | Example 10 |
|---|---|---|---|---|---|---|
|  | $Si_{90}Al_{10}N_x$ (25) | $Si_{90}Al_{10}N_x$ (33) | $Si_{90}Al_{10}N_x$ (33) | $Si_{90}Al_{10}N_x$ (33) | $Si_{90}Al_{10}N_x$ (33) | $Si_{90}Al_{10}N_x$ (33) |
|  | $ZnSnO_x$ (5) | $ZnSnO_x$ (5) | $ZnSnO_x$ (5) | $ZnSnO_x$ (5) | $ZnSnO_x$ (5) | $ZnSnO_x$ (5) |
|  | $TiO_x$ (2.5) | $TiO_x$ (2.5) | $TiO_x$ (2.5) | $TiO_x$ (2.5) | $TiO_x$ (2.5) | $TiO_x$ (2.5) |
|  | ZnO:Al (5) | ZnO:Al (5) | ZnO:Al (5) | ZnO:Al (5) | ZnO:Al (5) | ZnO:Al (5) |
|  | Ag (10.5) | Ag (12) | Ag (12) | Ag (9) | Ag (9) | Ag (9) |

TABLE 1-continued

Haze score, oil rub result, and brush test score for a number of comparative coated glass panes and coated glass panes according to the present invention.

| | | | | | |
|---|---|---|---|---|---|
| | ZnO:Al (2) | ZnO:Al (2) | ZnO:Al (2) | | ZnO:Al (2) |
| TiO$_x$ (2) | | TiO$_x$ (2) | TiO$_x$ (2) | TiO$_x$ (2) | |
| ZnSnO$_x$ (2) | ZnSnO$_x$ (2) | | | ZnSnO$_x$ (2) | ZnSnO$_x$ (3) |
| ZnO:Al (4) | ZnO:Al (5) | ZnO:Al (4) | ZnO:Al (4) | | ZnO:Al (4) |
| | | | | TiO$_x$ (2) | |
| ZnSnO$_x$ (10) | ZnSnO$_x$ (16) | ZnSnO$_x$ (16) | ZnSnO$_x$ (5) | ZnSnO$_x$ (8) | |
| Si$_{90}$Al$_{10}$N$_x$ (17) | Si$_{90}$Al$_{10}$N$_x$ (20) | Si$_{90}$Al$_{10}$N$_x$ (20) | Si$_{90}$Al$_{10}$N$_x$ (28) | | |
| | | | | AlN (20) | AlN (24) |
| | | | | ZnSnO$_x$ (8) | ZnSnO$_x$ (9) |

| | | | | | | |
|---|---|---|---|---|---|---|
| Haze score | 0 (Pass) | 1 (Pass) | 1 (Pass) | 1 (Pass) | 0 (Pass) | 0 (Pass) |
| Oil rub score | 0 (Pass) | 0 (Pass) | 0 (Pass) | 0 (Pass) | <1 (Pass) | 0 (Pass) |
| Brush test score | Scratch (7) + some delamination (fail) | Scratch (5) (fail) | Scratch (3) (pass) | Scratch (2) (Pass) | Scratch (0) (Pass) | Scratch (3) (Pass) |

The methodology used to collect the data in Table 1 is set out below. The layers were deposited onto a glass pane in sequence starting with the layer at the top of each column.

Heat Treatability Tests

After the deposition of the coatings of Examples 1-10 the samples were heat treated at about 650° C. for about 5 minutes. Thereafter the haze of each sample was measured. The results are listed in Table 1 above.

A subjective visible haze scoring system was applied to the Examples. The quality assessment system described hereinafter was found to be needed to distinguish better the visual quality of coatings under bright light conditions, properties that are not fully reflected by standard haze values measured in accordance with ASTM D 1003-61.

The evaluation system considers the more macroscopic effect of visible faults in the coating which cause local colour variations where the coating is damaged or imperfect (haze score in Table 1). Macroscopic effects of visible faults in the coating after a heat treatment (all examples exhibit no haze before a heat treatment) were assessed subjectively by viewing samples under bright light. The evaluation is based upon a perfectness scoring (rating) system using scores between 0 (perfect, no faults) through to 3 (high number of clearly visible faults and/or spots) up to 5 (dense haze, often already visible to the naked eye), rating the visual appearance of the coated glass samples after a heat treatment.

The visual evaluation was carried out by using a 2.5 million candle power beam (torch) that is directed at incidence angles between about −90° to about +90° (relative to normal incidence) in two orthogonal planes (i.e. turning the torch first in a horizontal plane and then in a vertical plane) onto a coated glass pane that is arranged in front of a black box. The black box has a sufficiently large size such that several coated glass samples can be evaluated at the same time. The coated glass panes are observed and their visual quality was assessed by varying the angle of incidence as described above, by directing the light beam from the observer through the coated glass panes. The coated glass panes were arranged in front of the black box such that their coating faced the observer. Heat treated coated glass panes with any score ≥3 are considered as having failed the test.

Mechanical Robustness Tests

As will be explained hereinafter the coated glass panes of Examples 5-10 not only proved to be heat treatable—as reflected by very low haze scores after heat treatment—but also showed similar, if not better, results than comparable prior art coated panes in a number of robustness tests simulating processing and handling of the coated glass panes. The robustness tests comprised an oil rub and a brush test carried out prior to any heat treatment and the results are shown in Table 1.

An oil rub test serves to simulate the influence of cutting oils used for cutting glass panes on the mechanical robustness of a coating. Coated glass panes which do not withstand an oil rub test will be difficult to process and are unsuitable for most practical applications. The coated samples are rubbed using a felt pad with an area of 1.2*1.2 cm$^2$ soaked in microscope oil of refractive index of 1.515-1.517. The samples are subjected to 500 cycles with a 1,000 g load at a speed of 37 cycles per minute. Oil rubbed samples are evaluated using an internal evaluation system on a perfectness scale of 0 (perfect, no damage) to 3 (part of coating stack completely removed). A score of 1 or less is considered acceptable.

A brush test is carried out to assess the mechanical robustness of coatings by simulating the effect of washing brushes on the coated glass surface. The test uses the following brush equipment:

A pillar drill (e.g. from company Ryobi® is fitted with a cup brush of a Benteler® washing machine with 0.5 mm diameter polypropylene bristles fixed in a 15 cm diameter cup. After having wetted the glass surface with a water spray in the area to be brushed the rotating brush is lowered so as to touch the coated glass surface and further lowered by another 2 mm to achieve a rotation with a 2 mm deflection of the bristles. The brush is rotated on the coated glass panes at a speed of 240 rpm for 15 s and thereafter released from the glass surface. The brushed glass surface is dried and the brushing result is finally evaluated by visual inspection. Evaluation is carried out by rating the brush-treated coated glass panes against a set of photographs of different degrees of damage rated between 1 (perfect) and 8 (fully destroyed) using a brush test rating scheme as described below in more detail:

0: coating un-marked,
2: up to 3 rings visible in the brushed area, a ring meaning a scratch equivalent to the width of one bristle of the brush;
3: more than 3 complete rings in the brushed area;
5: several rings in the brushed area, with at least one being >3 mm wide; no delamination;
8: large number of rings/scratches in the brushed area.

A score of 3 or less is considered acceptable. Any delamination of the coating is considered as a failure.

Summary of Results

Comparative Example 1 utilises a stack with a NiCrO$_x$/ZnO:Al barrier layer arrangement. Example 1 exhibits an acceptable level of haze (score 1) and showed good performance in the mechanical robustness tests.

Comparative Example 2 has a similar arrangement to Example 1 but utilises $ZnSnO_x/Si_{90}Al_{10}N_x$ as the outer two layers instead of $AlN/ZnSnO_x$. This change results in an increase in haze (score 2) and a notable degree of delamination of the coating in both robustness tests (i.e. both tests were failed).

Comparative Example 3 adds a $TiO_x$ separation layer to the lower AR layer and uses a $ZnO:Al/TiO_x$ barrier layer arrangement over the silver layer. The brush test was failed with a large number of rings/scratches and some delamination.

Comparative Example 4 is similar to Example 3 but reverses the order of the partial barrier layers. This change results in excellent haze performance (score 0) but the sample behaves disastrously in the mechanical robustness tests with significant delamination observed.

Example 5 is similar to Comparative Example 4 but with the addition of a thin $ZnSnO_x$ partial barrier layer between the $TiO_x$ and $ZnO:Al$ partial barrier layers. This modification results in a significant improvement in mechanical robustness under both the oil rub test (no damage) and the brush test (scratch score 7 and some delamination). The difference between the results of the oil rub test for Comparative Example 4 and Example 5 can be seen in FIG. 1 which shows photographs of the coated panes of Comparative Example 4(A) and Example 5(B) after undergoing the test. The total delamination that occurred with Comparative Example 4 and the lack of damage to Example 5 are clearly visible. This durability improvement occurs without compromising the heat treatability of the stack (haze score 0).

Example 6 is similar to Example 5 but swaps the $TiO_x$ partial barrier layer directly above silver for a $ZnO:Al$ partial barrier layer. This sample performs well in the mechanical robustness tests with no damage exhibited in the oil rub test and minimal damage (scratch score 5) suffered in the brush test. Again, the robustness improvement is not at the expense of the heat treatability of the sample (haze score 1).

Example 7 replaces the $ZnSnO_x$ partial barrier layer of Example 6 with a layer of $TiO_x$. This change affords the same haze and oil rub test characteristics as Example 6 and a slight improvement in robustness according to the brush test (scratch score 3).

Example 8 has the same layer arrangement as Example 7 but with modified thicknesses for some of the layers (silver and $ZnSnO_x$ and $Si_{90}Al_{10}N_x$ in the upper AR layer). This sample also shows excellent performance in the heat treatability and mechanical robustness tests, with a slight improvement in the brush test (scratch score 2).

Example 9 utilises a $TiO_x/ZnSnO_x/TiO_x$ barrier layer arrangement and a $ZnSnO_x/AlN/ZnSnO_x$ upper AR layer. This sample exhibits excellent heat treatability (haze score 0) and robustness with a score of less than 1 in the oil test and a scratch score of 0 in the brush test.

Example 10 uses a $ZnO:Al/ZnSnO_x/ZnO:Al$ barrier layer combination and an $AlN/ZnSnO_x$ upper AR layer. This sample also exhibits excellent heat treatability (haze score 0) and robustness (a score of 0 in the oil test and a scratch score of 3 in the brush test).

The invention claimed is:

1. A coated glass pane comprising at least the following sequence of layers:
   a glass substrate;
   a lower anti-reflection layer, the lower anti-reflection layer comprising in sequence from the glass substrate:
   a base layer, located directly on the glass substrate, based on an (oxi)nitride of silicon and/or an (oxi)nitride of aluminium and/or alloys thereof, and/or an oxide of titanium, and/or an oxide of zirconium; and
   a layer based on an oxide of zinc and tin and/or and oxide of tin; and
   a top layer based on an oxide of zinc;
   a silver-based functional layer located on the lower anti-reflection layer;
   a barrier layer located directly on the silver-based functional layer, the barrier layer comprising in direct sequence from the silver-based functional layer the following three partial barrier layers;
   a lower partial barrier layer having a thickness of at most 5 nm;
   a central partial barrier layer having a thickness of at most 5 nm; and
   an upper partial barrier layer; and wherein
   the three partial barrier layers are selected from the group consisting of the following combinations of layers in the order lower partial barrier layer/central partial barrier layer/upper partial barrier layer: $ZnO:Al/ZnSnO_x/ZnO:Al$, $TiO_x/ZnSnO_x/ZnO:Al$, $TiO_x/ZnSnO_x/TiO_x$ and $ZnO:Al/ZnSnO_x/TiO_x$; and
   wherein
   an upper anti-reflection layer located directly on the upper partial barrier layer; and
   wherein the coated glass pane has a high visible light transmittance.

2. The pane according to claim 1, wherein the lower anti-reflection layer comprises, in sequence from the glass substrate,
   a base layer based on an (oxi)nitride of silicon, an (oxi)nitride of aluminium and/or alloys thereof, an oxide of Ti, and/or an oxide of Zr;
   a layer based on an oxide of Zn and Sn and/or an oxide of Sn,
   a separation layer based on a metal oxide and/or an (oxi)nitride of silicon and/or an (oxi)nitride of aluminium, and
   a top layer based on an oxide of Zn.

3. The pane according to claim 1, wherein the pane comprises more than one silver-based functional layer.

4. The pane according to claim 3, wherein each silver-based functional layer is spaced apart from an adjacent silver-based functional layer by an intervening central anti-reflection layer.

5. The pane according to claim 1, wherein the lower partial barrier layer of the barrier layer has a thickness of less than 5 nm.

6. The pane according to claim 1, wherein the central partial barrier layer of the barrier layer has a thickness of less than 5 nm.

7. The pane according to claim 1, wherein the central partial barrier layer of the barrier layer has a thickness of less than 4 nm.

8. The pane according to claim 1, wherein the upper partial barrier layer of the barrier layer has a thickness of less than 10 nm.

9. The pane according to claim 1, wherein the barrier layer has a total thickness of at most 12 nm.

10. The pane according to claim 1, wherein the lower, central and upper partial barrier layers of the barrier layer are based on essentially stoichiometric metal oxides.

11. The pane according to claim 1, wherein the lower partial barrier layer of the barrier layer is based on an oxide of Zn and/or an oxide of Ti.

12. The pane according to claim 1, wherein the central partial barrier layer of the barrier layer is based on an oxide of Zn, an oxide of Ti and/or an oxide of Zn and Sn.

13. The pane according to claim 1, wherein the upper partial barrier layer of the barrier layer is based on an oxide of Zn and/or an oxide of Ti.

14. The pane according to claim 1, wherein the upper anti-reflection layer comprises, in sequence from the barrier layer, a layer based on an (oxi)nitride of aluminium and/or an (oxi)nitride of silicon, and a layer based on a metal oxide.

15. The pane according to claim 14, wherein the layer based on an (oxi)nitride of aluminium and/or an (oxi)nitride of silicon in the upper anti-reflection layer has a thickness of from 10 to 30 nm.

16. The pane according to claim 14, wherein the layer based on a metal oxide in the upper anti-reflection layer has a thickness of from 2 to 20 nm.

17. A method of manufacturing a coated glass pane in accordance with claim 1, wherein any portion of the lower partial barrier layer that is in direct contact with the silver-based functional layer is deposited by sputtering in an atmosphere with no or up to 5 vol. % oxygen.

18. The method according to claim 17, wherein both the lower and the upper partial barrier layers are deposited by non-reactive sputtering, and wherein the central partial barrier layer is deposited by reactive sputtering.

19. A multiple glazing incorporating a pane in accordance with claim 1.

20. The pane according to claim 1, wherein the pane has a visible light transmittance of above 86%.

* * * * *